United States Patent
Grogg

(10) Patent No.: US 9,850,814 B2
(45) Date of Patent: Dec. 26, 2017

(54) ANNULAR SPRING FOR A BEARING ASSEMBLY OF A GAS TURBINE ENGINE

(71) Applicant: United Technologies Corporation, Hartford, CT (US)

(72) Inventor: Gary L. Grogg, South Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 23 days.

(21) Appl. No.: 14/626,659

(22) Filed: Feb. 19, 2015

(65) Prior Publication Data

US 2015/0233293 A1   Aug. 20, 2015

Related U.S. Application Data

(60) Provisional application No. 61/941,855, filed on Feb. 19, 2014.

(51) Int. Cl.

| | |
|---|---|
| *F02C 7/06* | (2006.01) |
| *F16F 1/02* | (2006.01) |
| *F16C 27/04* | (2006.01) |
| *F16C 35/077* | (2006.01) |
| *F16C 19/26* | (2006.01) |

(52) U.S. Cl.
CPC ........... *F02C 7/06* (2013.01); *F16C 27/04* (2013.01); *F16F 1/025* (2013.01); *F16C 19/26* (2013.01); *F16C 27/045* (2013.01); *F16C 35/077* (2013.01); *F16C 2360/23* (2013.01); *Y02T 50/671* (2013.01)

(58) Field of Classification Search
CPC ........ F16C 27/00; F16C 27/04; F16C 27/045; F16C 27/06; F16C 11/12; F16C 19/26; F16C 35/077; F16C 2360/23; F01D 25/164; F16F 15/0237; F16F 15/073; F16F 15/06; F16F 15/1208; F16F 15/1215; F16F 15/173; F16F 1/32; F16F 1/025; F16F 1/324; F16F 1/02; F16F 1/34; F16F 1/10; F16F 1/326; F16F 1/328; F16F 1/428; F02C 7/06; Y02T 50/671
USPC .............. 267/160, 161; 415/110–113, 119, 415/229–231; 384/202, 438, 477, 384/535–537, 572, 581–583, 593
See application file for complete search history.

(56) References Cited

U.S. PATENT DOCUMENTS

| | | | | |
|---|---|---|---|---|
| 2,407,757 | A * | 9/1946 | MacCallum | F16D 27/112 192/200 |
| 2,690,529 | A * | 9/1954 | Lindblad | H01F 7/1638 267/160 |
| 2,767,973 | A * | 10/1956 | Ter Veen | G01P 15/11 267/161 |
| 3,123,095 | A * | 3/1964 | Kohler | F04B 39/1053 137/516.23 |
| 3,844,630 | A * | 10/1974 | Lechner | F16C 27/045 384/99 |
| 4,323,994 | A * | 4/1982 | Coogler | G01V 1/181 267/158 |
| 4,458,344 | A * | 7/1984 | Coogler | G01V 1/181 267/161 |

(Continued)

*Primary Examiner* — Ingrid M Weinhold
(74) *Attorney, Agent, or Firm* — O'Shea Getz P.C.

(57) ABSTRACT

An annular spring for a bearing assembly of gas turbine engine is provided. The annular spring includes a multiple of ligaments between an inner support and an outer support.

18 Claims, 10 Drawing Sheets

(56) References Cited

U.S. PATENT DOCUMENTS

| | | | | |
|---|---|---|---|---|
| 4,669,893 A * | 6/1987 | Chalaire | F16C 27/045 | 384/535 |
| 4,740,854 A * | 4/1988 | Shibuya | G11B 5/54 | 360/246.4 |
| 4,782,919 A | 11/1988 | Chalaire et al. | | |
| 4,792,708 A * | 12/1988 | Boyer | H02K 33/02 | 267/181 |
| 4,867,655 A | 9/1989 | Barbic et al. | | |
| 4,872,767 A * | 10/1989 | Knapp | F01D 25/164 | 384/535 |
| 5,110,257 A * | 5/1992 | Hibner | F01D 25/164 | 415/119 |
| 5,280,889 A * | 1/1994 | Amil | F16F 1/02 | 248/618 |
| 5,425,584 A * | 6/1995 | Ide | F01D 25/164 | 384/581 |
| 5,525,845 A * | 6/1996 | Beale | F02G 1/0435 | 310/12.27 |
| 5,531,522 A * | 7/1996 | Ide | F01D 25/164 | 384/202 |
| 5,603,574 A * | 2/1997 | Ide | F01D 25/164 | 384/117 |
| 5,969,446 A * | 10/1999 | Eisenhaure | F16F 15/1428 | 310/51 |
| 5,977,677 A * | 11/1999 | Henry | F01D 25/164 | 310/90 |
| 6,050,556 A * | 4/2000 | Masuda | F04B 35/045 | 188/378 |
| 6,131,914 A * | 10/2000 | Proveaux | F01D 25/183 | 277/412 |
| 6,155,720 A * | 12/2000 | Battig | F16C 27/02 | 384/99 |
| 6,224,533 B1 * | 5/2001 | Bengtsson | B04B 9/12 | 384/535 |
| D468,729 S * | 1/2003 | Takayama | D14/224 | |
| 7,195,235 B2 * | 3/2007 | Rode | F16F 3/10 | 267/161 |
| D554,491 S * | 11/2007 | Stenberg | D8/349 | |
| D554,984 S * | 11/2007 | Stenberg | D8/349 | |
| 7,553,123 B2 * | 6/2009 | Casaro | F01D 25/164 | 384/536 |
| 7,625,121 B2 * | 12/2009 | Pettinato | F16C 17/03 | 384/117 |
| 7,683,608 B2 * | 3/2010 | Kiermeier | G01M 7/04 | 324/756.01 |
| 7,828,512 B2 * | 11/2010 | Eilers | F04D 19/042 | 415/104 |
| 8,083,413 B2 * | 12/2011 | Ertas | F16C 17/035 | 384/117 |
| 8,091,450 B2 * | 1/2012 | Manzoor | F16F 15/1428 | 464/73 |
| 8,176,809 B2 * | 5/2012 | Lhrke; Chris A | B25J 17/0241 | 267/161 |
| 8,282,285 B2 * | 10/2012 | Brillon | F01D 25/162 | 384/215 |
| 8,297,917 B1 | 10/2012 | McCune et al. | | |
| 8,585,005 B2 * | 11/2013 | Krempel | B60H 1/00457 | 248/560 |
| 8,608,175 B2 | 12/2013 | Miller et al. | | |
| 8,636,413 B2 * | 1/2014 | Fiedler | F01D 25/164 | 384/535 |
| 8,714,557 B2 | 5/2014 | Miller et al. | | |
| 8,794,009 B2 | 8/2014 | Glahn et al. | | |
| 8,814,503 B2 | 8/2014 | McCune et al. | | |
| 8,834,095 B2 | 9/2014 | Davis | | |
| 8,876,094 B1 * | 11/2014 | Ridgeway | F16F 1/34 | 267/160 |
| 8,899,915 B2 | 12/2014 | McCune et al. | | |
| 9,285,073 B2 * | 3/2016 | Ellis | F16F 1/324 | |
| 2008/0292234 A1 * | 11/2008 | Wada | F16C 27/045 | 384/582 |
| 2009/0304313 A1 * | 12/2009 | Ertas | F16C 17/035 | 384/99 |
| 2010/0145510 A1 * | 6/2010 | Ihrke | B25J 17/0241 | 700/245 |
| 2011/0150378 A1 * | 6/2011 | Care | F01D 25/164 | 384/438 |
| 2012/0160091 A1 * | 6/2012 | Dadd | F16F 1/027 | 92/132 |
| 2014/0158492 A1 * | 6/2014 | Roby | F16D 27/11 | 192/66.31 |
| 2014/0241911 A1 * | 8/2014 | Roman | F04B 35/045 | 417/328 |
| 2015/0010387 A1 * | 1/2015 | Daimer | F04D 29/668 | 415/119 |

* cited by examiner

ANNULAR SPRING FOR A BEARING ASSEMBLY OF A GAS TURBINE ENGINE

CROSS-REFERENCE TO RELATED APPLICATION

This application claims priority to U.S. Provisional Patent Application Ser. No. 61/941,855 filed Feb. 19, 2014, which is hereby incorporated herein by reference in its entirety.

BACKGROUND

The present disclosure relates to a gas turbine engine and, more particularly, to bearing compartments thereof.

Gas turbine engines typically include one or more rotor shafts that transfer power and rotary motion from a turbine section to a compressor section and a fan section. Each rotor shaft is supported by a plurality of bearing systems.

Rotor dynamics require some bearing systems to be sprung and damped. A spring with a series of beams arranged in a cage-like structure provides particular rotor dynamic stiffness requirements while the damper minimizes the transfer of vibrational forces from and into static structure. Engine arrangement configurations, clearance requirements, geometric tolerance, thermal growth considerations and bearing location requirements define a bearing compartment axial length which, in a turbine section, typically affects a turbine disk bore dimension and the weight thereof. Although effective, such springs require relatively considerable axial space.

SUMMARY

An annular spring for a bearing assembly of gas turbine engine, according to one disclosed non-limiting embodiment of the present disclosure, includes an inner support, an outer support and a multiple of ligaments between the inner support and the outer support.

In a further embodiment of the present disclosure, each of the multiple of ligaments are serpentine shaped.

In a further embodiment of any of the foregoing embodiments of the present disclosure, each of the multiple of ligaments includes a radial flat.

In a further embodiment of any of the foregoing embodiments of the present disclosure, each of the multiple of ligaments is radiused.

In a further embodiment of any of the foregoing embodiments of the present disclosure, each of the multiple of ligaments form opposed semi-circles.

In a further embodiment of any of the foregoing embodiments of the present disclosure, the annular spring is additively manufactured.

A bearing compartment for a gas turbine engine, according to another disclosed non-limiting embodiment of the present disclosure, includes a bearing support static structure and a bearing assembly radially inboard of the bearing support static structure. An oil film damper is radially between the bearing assembly and the bearing support static structure. An annular spring is radially between the bearing assembly and the bearing support static structure. The annular spring includes a multiple of ligaments In a further embodiment of any of the foregoing embodiments of the present disclosure, each of the multiple of ligaments are serpentine shaped and are circumferentially distributed.

In a further embodiment of any of the foregoing embodiments of the present disclosure, each of the multiple of ligaments extends between an inner support and an outer support. The inner support is supported upon the oil film damper.

In a further embodiment of any of the foregoing embodiments of the present disclosure, each of the multiple of ligaments extend between an inner support and an outer support. The outer support is supported upon the bearing support static structure.

In a further embodiment of any of the foregoing embodiments of the present disclosure, the bearing assembly supports an engine shaft.

In a further embodiment of any of the foregoing embodiments of the present disclosure, the oil film damper is top hat shaped in cross-section.

In a further embodiment of any of the foregoing embodiments of the present disclosure, a retaining ring is included that retains the oil film damper to an outer race of the bearing assembly.

In a further embodiment of any of the foregoing embodiments of the present disclosure, each of the multiple of ligaments has an axial length that is less than an axial length of the bearing assembly.

A method of supporting a bearing within a gas turbine engine, according to another disclosed non-limiting embodiment of the present disclosure, includes locating an annular spring radially between an oil film damper and a bearing support static structure. The annular spring includes a multiple of ligaments.

In a further embodiment of any of the foregoing embodiments of the present disclosure, the method includes radially orienting the multiple of ligaments.

In a further embodiment of any of the foregoing embodiments of the present disclosure, the method includes orienting the multiple of ligaments in a serpentine.

In a further embodiment of any of the foregoing embodiments of the present disclosure, the method includes locating the multiple of ligaments each having an axial length that is less than an axial length of the oil film damper.

In a further embodiment of any of the foregoing embodiments of the present disclosure, the method includes locating a multiple of annular springs radially between an oil film damper and a bearing support static structure. The multiple of annular springs flanking the oil film damper.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
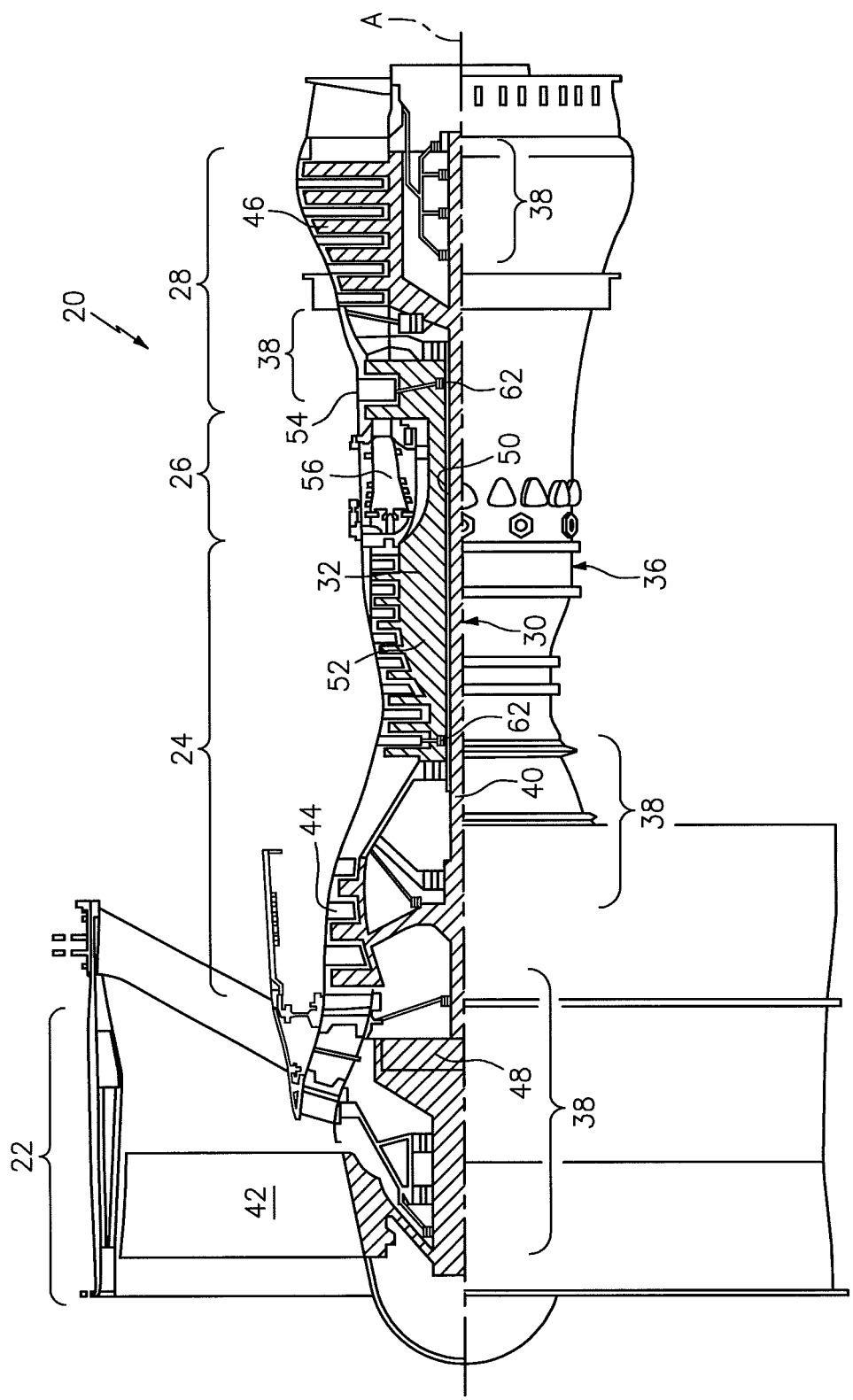
FIG. 1 is a schematic cross-section of an example gas turbine engine architecture.
Figure 2:
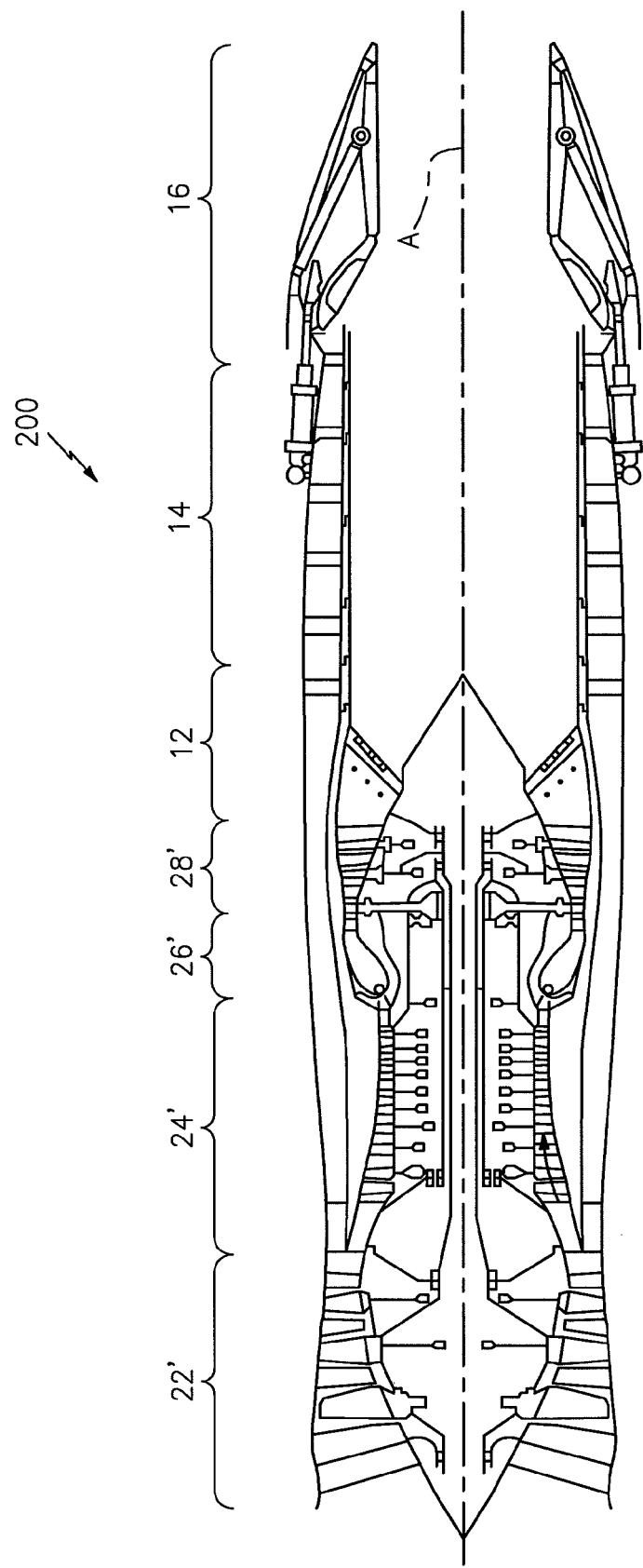
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24. The compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans with an intermediate spool.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by bearing compartments 38 within the static structure 36. It should be understood that various bearing compartments 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In the high bypass embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
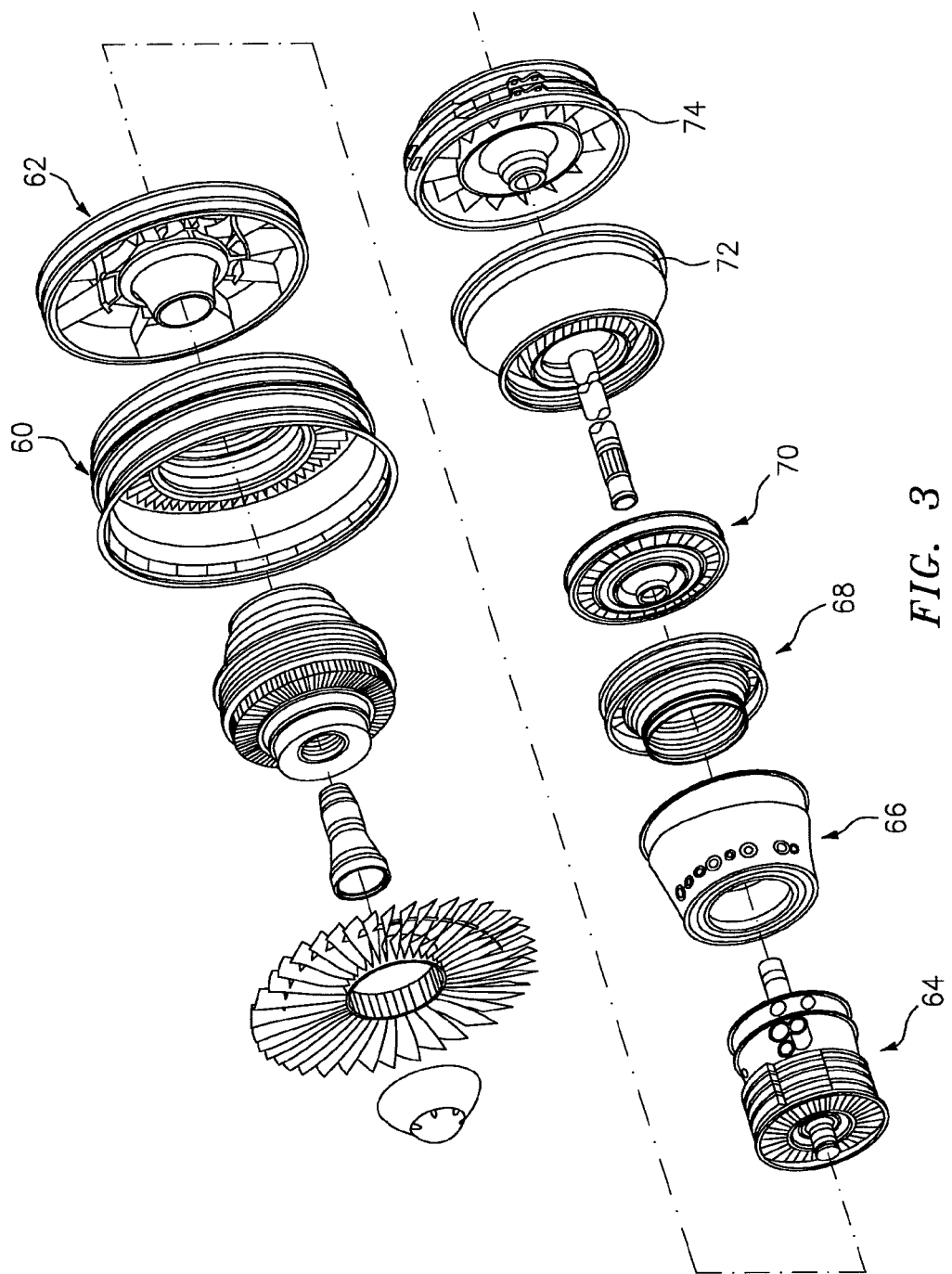
FIG. 3 is an exploded view of an engine module structure.

With reference to FIG. 3, the engine static structure 36 (see FIG. 1) of an example high bypass turbofan generally includes an assembly of a multiple of modules to include a fan module 60, an intermediate module 62, a HPC module 64, a diffuser module 66, a High Pressure Turbine (HPT) module 68, a mid turbine frame (MTF) module 70, a Low Pressure Turbine (LPT) module 72, and a Turbine Exhaust case (TEC) module 74. It should be appreciated that various additional or alternative cases will also benefit herefrom and the cases 60-74 are typically assembled and disassembled at a flange interface therebetween.

Figure 4:
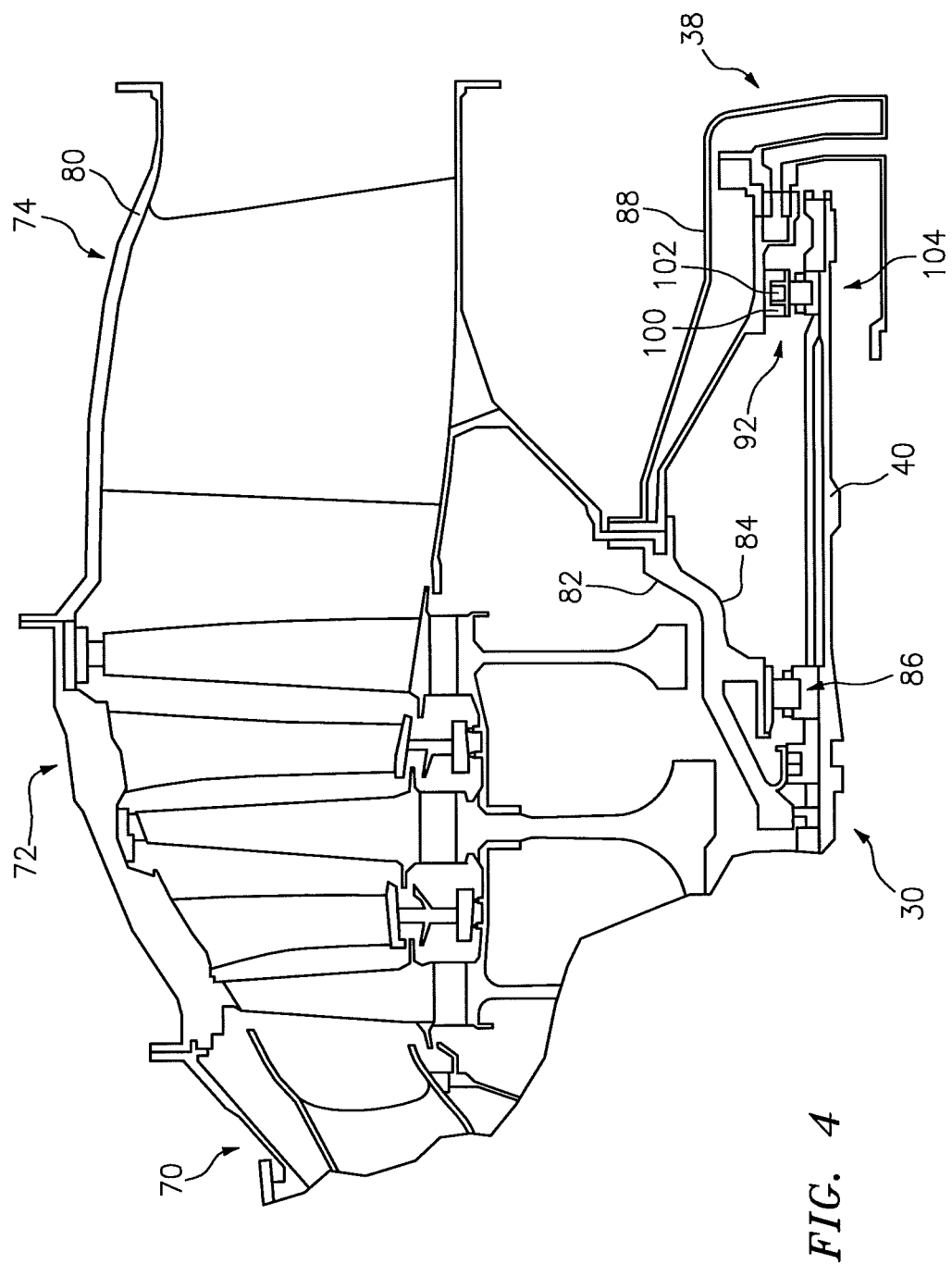
FIG. 4 is a schematic sectional view of a turbine exhaust case module with a bearing compartment that contains a first and second bearing system.

With reference to FIG. 4, the TEC module 74 generally includes a case 80, a forward heat shield 82, a forward bearing support 84, a forward bearing 86, an aft heat shield 88, an aft bearing support 90 and an aft bearing 92. The forward bearing 86 and the aft bearing 92 are, in the disclosed non-limiting embodiment, the #5 and #6 bearing within a rear bearing compartment 38 to support the inner shaft 40 of the low spool 30 with respect to the case 80. It should be appreciated that although damped bearings typically located in the rear bearing compartments are illustrated in the disclosed non-limiting embodiment, various bearing compartments in various modules of the engine will also benefit herefrom.

Figure 5:
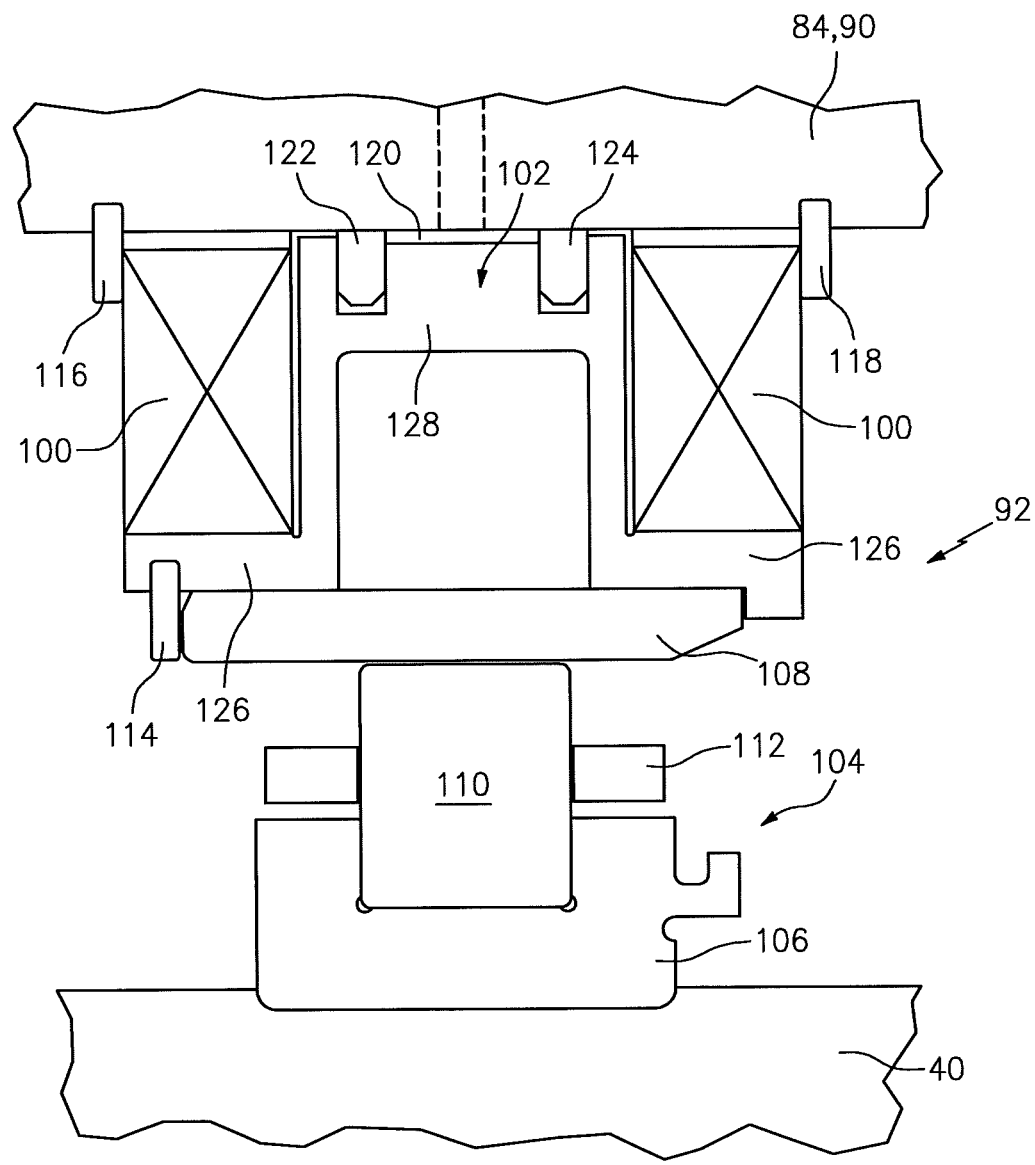
FIG. 5 is an expanded sectional view of a damped and sprung bearing system.

With reference to FIG. 5, the aft bearing 92 is a sprung and/or damped type bearing architecture that generally includes an annular spring 100, an oil film damper 102 and a bearing assembly 104. It should be appreciated that although a particular configuration is illustrated various configurations will benefit herefrom.

The bearing assembly 104 includes an inner race 106, an outer race 108 and a multiple of bearing elements 110 such as balls, rollers or pins therebetween with a cage 112. The inner race 106 is fit upon a rotational structure such as the illustrated inner shaft 40 of the low spool 30. The outer race 108 is fit within the static structure such as the bearing support static structure 84, 90 through the annular spring 100 and the oil film damper 102.

In one disclosed non-limiting embodiment, the oil film damper 102 is generally top hat shaped in cross-section and retained to the outer race 108 via a retaining ring 114. Likewise, the oil film damper 102 is retained to the bearing support static structure 84, 90 via retaining rings 116, 118 while an oil film 120 is formed between seals 122, 124. Oil is thereby contained in the annulus formed between the static structure 84, 90 and the oil film damper 102 by the seals 122, 124 such that the oil may function as a fluid damper to damp the bearing assembly 104. It should be appreciated that various oil passages may be provided to communicate oil into the annulus such as through the bearing support static structure 84, 90. The annular spring 100 and oil film damper 102 thereby absorbs rotor motion associated with, for example, non-synchronous vibration yet provide an axially compact assembly.

The retaining rings 116, 118 further retains the annular spring 100 (two shown) axially along the oil film damper 102. Each of the annular springs 100 (one shown in FIG. 6) are supported upon an axial flange 126 of the oil film damper 102 and flank a central radial extension 128 of the oil film damper 102. That is, the axial flange 126 that flanks the central radial extension 128 to define the "top hat" type shape in cross section. It should be appreciated that various dampers may alternatively or additionally be provided. Although one annular spring 100 will be described it should be appreciated that such description is applicable to the other annular spring 100.

Figure 6:
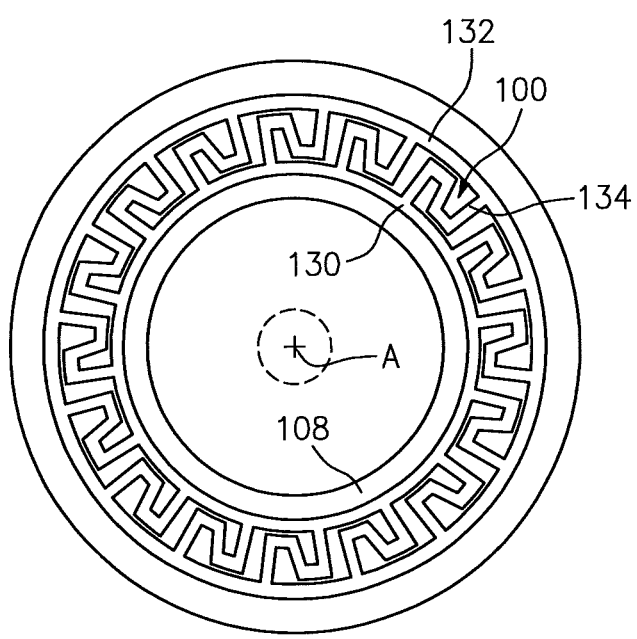
FIG. 6 is a plan view of an annular spring of the sprung and damped bearing system.
Figure 7:
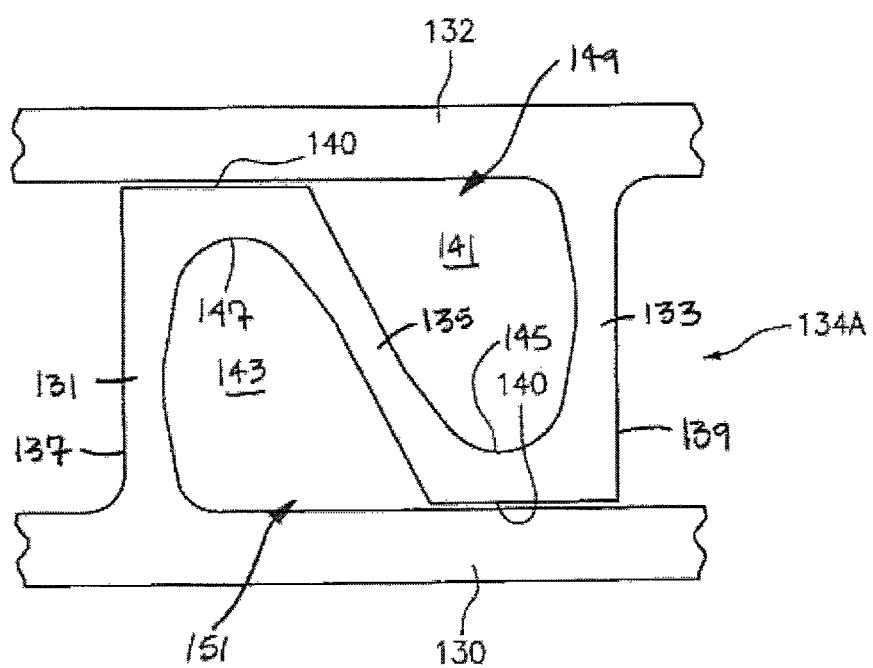
FIG. 7 is an expanded view of a ligament of the annular spring according to one the disclosed non-limiting embodiment.

With reference to FIG. 6, the annular spring 100 generally includes an inner support 130, an outer support 132 and a multiple of ligaments 134 (shown individually in FIG. 7) therebetween. In this disclosed non-limiting embodiment, the inner support 130 and outer support 132 are rings. The annular spring 100, here disclosed as two separate annular springs 100 that flank the oil film damper 102, are readily contained along the axial length of the bearing assembly 104. That is the annular spring 100 is axially compact compared to conventional cage-like beam arrangements.

In other disclosed non-limiting embodiments, the inner support 130 of the annular spring 100 may form the outer race 108. That is, the annular spring 100 may integrate adjacent components rather than be separate therefrom.

While not to be limited to any single method, an additive manufacturing process is utilized to form the annular spring 100. Example additive manufacturing processes include, but are not limited to, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Direct Metal Laser Sintering (DMLS) and others. The additive manufacturing process facilitates manufacture of relatively complex components, minimize assembly details and minimize multi-component construction. The additive manufacturing process essentially "grows" articles from three-dimensional information, for example, a three-dimensional computer aided design (CAD) model. The three-dimensional information is converted into a plurality of slices, each slice defining a cross section of the article for a predetermined height of the slice. The additive manufactured component is then "grown" slice by slice, or layer by layer.

Each of the multiple of ligaments 134 are generally serpentine in shape and interconnect the inner support 130 and the outer support 132 at a multiple of circumferential locations. That is, the multiple of ligaments 134 foil the generally serpentine shape when viewed along the engine longitudinal axis A such that the serpentine shape is arranged in a plane that contains the inner support 130 and the outer support 132. For example, the ligament 134A in FIG. 7 includes a first end segment 131, a second end segment 133 and an intermediate segment 135 extending circumferentially between the first end segment 131 and the second end segment 133. The first end segment 131 projects substantially radially out from the inner support 130. The second end segment 133 projects substantially radially in from the outer support 132. With such a configuration, the ligament 134A has an overall circumferential width defined between an outside surface 137 of the first end segment 131 and an outside surface 139 of the second end segment 133. The ligament 134A in FIG. 7 forms a first indentation 141 (e.g., a recess) and a second indentation 143 (e.g., a recess). The first indentation 141 extends radially inward to a first indentation end 145, thereby providing the first indentation 141 with an open end 149 and a closed end at 145. The second indentation 143 extends radially outward to a second indentation end 147, thereby providing the second indentation 143 with an open end 151 and a closed end at 147. Referring again to FIG. 6, each of the multiple of ligaments 134 are located around and extend radially between the inner support 130 and the outer support 132 with respect to the engine central longitudinal axis A. It should be appreciated that any number of the multiple of ligaments 134 may be provided to provide a desired targeted stiffness in both the radial and circumferential direction.

Figure 8:
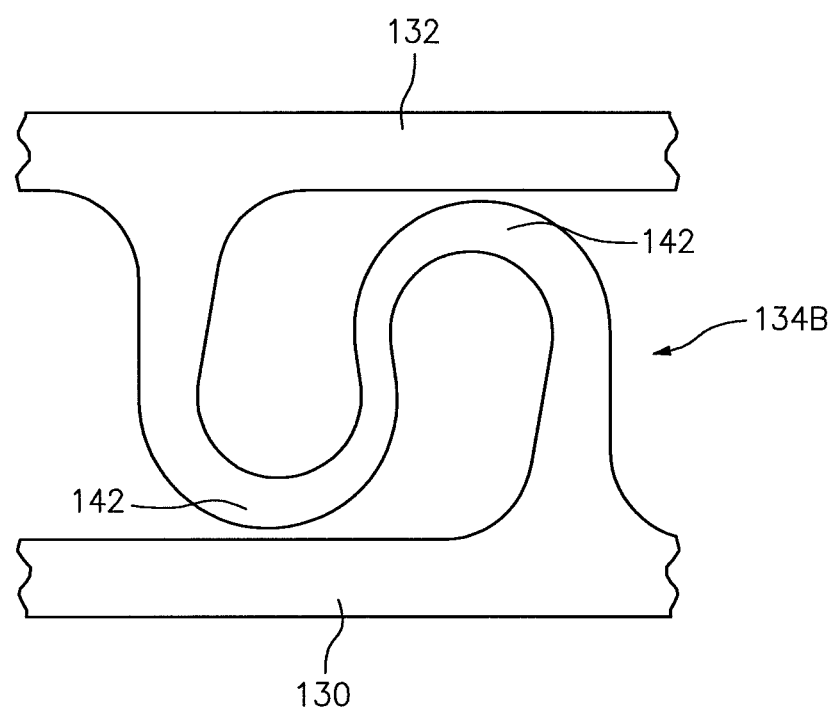
FIG. 8 is an expanded view of a ligament of the annular spring according to another disclosed non-limiting embodiment.
Figure 9:
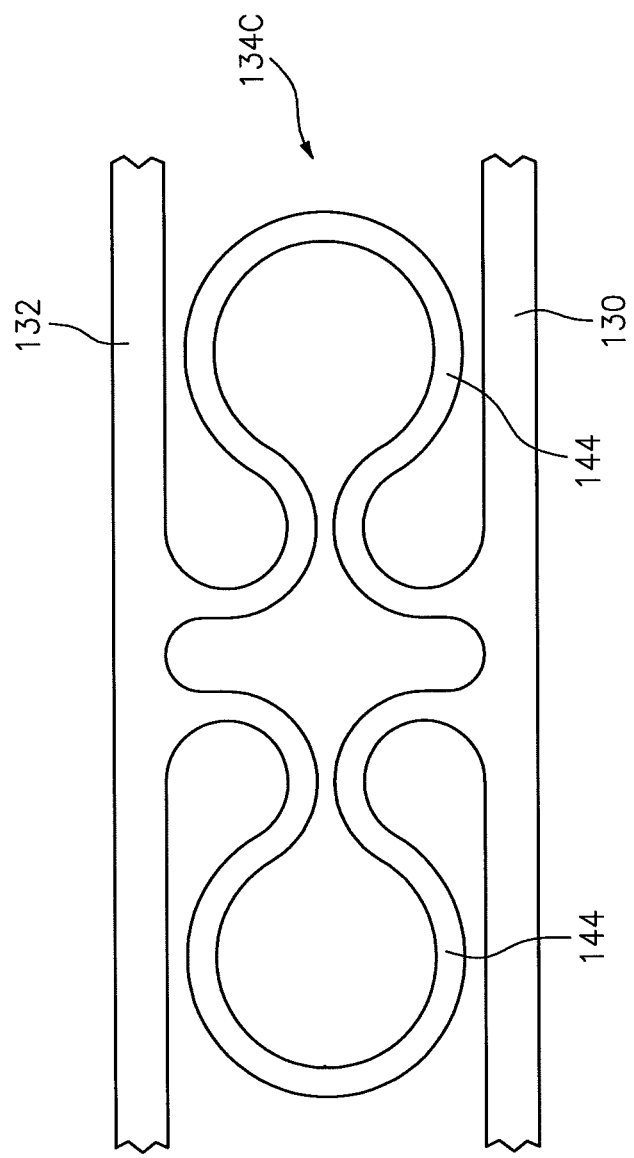
FIG. 9 is an expanded view of a ligament of the annular spring according to another disclosed non-limiting embodiment.

The multiple of ligaments 134 are shaped such that the targeted stiffness is similar in both the radial and circumferential direction so that the outer race 108 loads the annular springs 100 relatively uniformly when displaced. In one disclosed non-limiting embodiment, the ligaments 134A include radial flats 140 (see FIG. 7) that provide, for example, thickness within a compact radial packaging as well as a limit deflections to the width of the gap. In another disclosed non-limiting embodiment, the ligaments 134B are radiused 142 (see FIG. 8) to, for example, provide a desired flexibility. In still another disclosed non-limiting embodiment, the ligaments 134C form opposed semi-circles 144 (see FIG. 9) to, for example, provide a desired flexibility. It should be appreciated that various configurations will also benefit herefrom.

It should be appreciated that shaft deflections are not radial alone but are directional. For example, where the direction of the movement is toward top dead center, the movement near the top and bottom of the annular spring aligns roughly with a radial direction of the annular spring; however, at the "sides" of the annular spring, the motion is more tangential, e.g., sliding. If the sliding contact is limited by the curvature, the extremely high stiffness in this direction either dominates the overall stiffness or produces wear. Squirrel cage annular springs have roughly equivalent stiffness when subjected to offset loading or circumferential loading as the beams around circumference deflect roughly the same amount with roughly the same load which facilitates tuning for high stiffness without forcing non-uniform deflections of the outer race 108. The annular spring 100 thereby provides the benefits of the squirrel cage annular spring with an axially compact packaging architecture that facilitates an axially short bearing compartment, which in turn allows disk bores to be moved axially forward resulting in an axially shorter engine with reduced weight.

Figure 10:
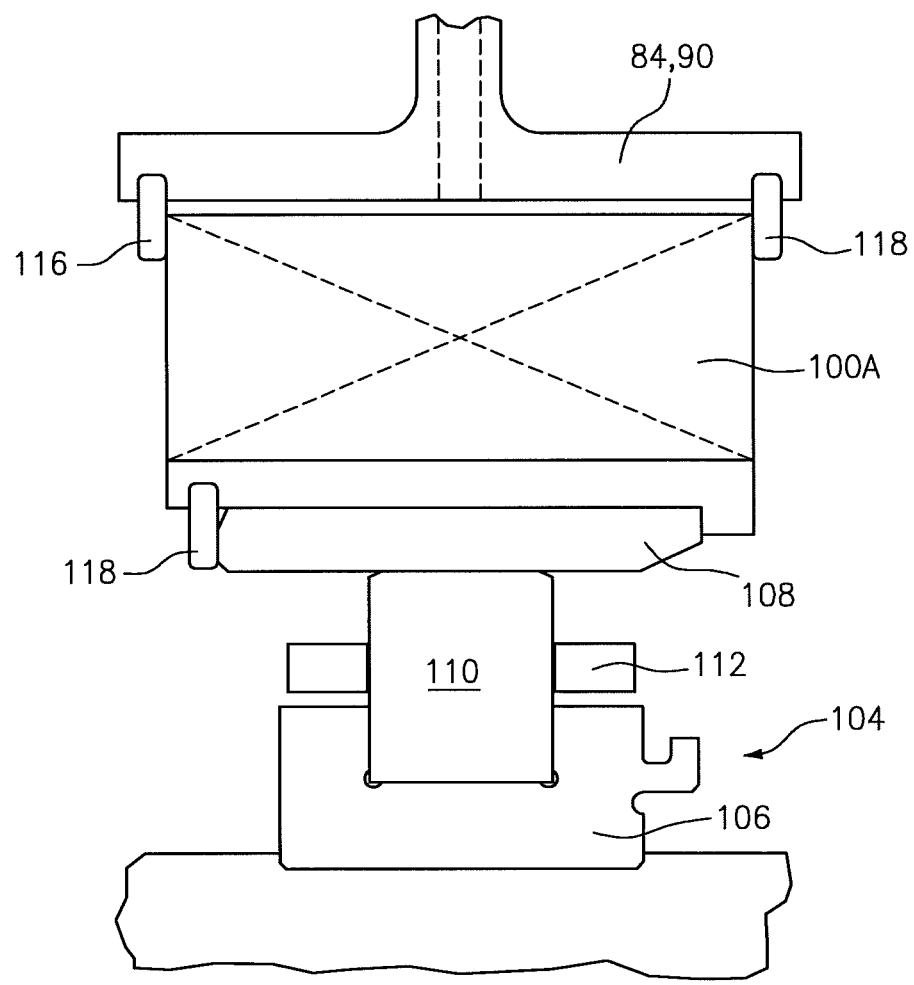
FIG. 10 is an expanded sectional view of a sprung bearing system according to one the disclosed non-limiting embodiment.

With reference to FIG. 10, the aft bearing 92A in this disclosed non-limiting embodiment includes an annular spring 100A but is not otherwise damped. It should be appreciated that although a particular configuration is illustrated various other configurations will also benefit herefrom.

The annular spring 100 facilitates a reduction in weight and mounting hardware, especially for roller bearings where the axial load is negligible and may be possible to retain the annular spring/damper with retaining rings. An additional benefit is the formation of a single, direct load path to the static structure in comparison to conventional designs that divide the load path—some load is directed through the oil film damper to the support, and some of the load is taken through the annular spring, flange and secondary support wall.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context; e.g., it includes the degree of error associated with measurement of the particular quantity. All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An assembly for a bearing assembly of gas turbine engine, the assembly comprising:
   an annular first spring;
   an annular second spring comprising
      an inner support;
      an outer support; and
      a multiple of ligaments between the inner support and the outer support, a first of the ligaments including a first end segment, a second end segment and an intermediate segment extending circumferentially between the first end segment and the second end segment;
      wherein the first end segment projects substantially radially out from the inner support, the second end segment projects substantially radially in from the outer support, and the first of the ligaments has an overall circumferential width defined between an outside surface of the first end segment and an outside surface of the second end segment; and
   an oil film damper comprising a first flange, a second flange and a center portion axially between and projecting radially outward from the first flange and the second flange, the center portion axially between the first spring and the second spring, wherein the first spring is supported by the first flange, and the second spring is supported by the second flange.

2. assembly as recited in claim 1, wherein each of the multiple of ligaments are serpentine shaped.

3. The assembly as recited in claim 1, wherein each of the multiple of ligaments includes a radial flat.

4. The assembly as recited in claim 1, wherein each of the multiple of ligaments is radiused.

5. The assembly as recited in claim 1, wherein the annular first spring is additively manufactured.

6. A bearing compartment for a gas turbine engine, comprising:
   a bearing support static structure;
   a bearing assembly radially inboard of the bearing support static structure;
   an oil film damper radially between the bearing assembly and the bearing support static structure;
   an annular first spring radially between the bearing assembly and the bearing support static structure; and
   an annular second spring radially between the bearing assembly and the bearing support static structure, the second spring including a multiple of ligaments, an inner support ring and an outer support ring;
   wherein a first of the multiple of ligaments is configured to form a first indentation and a second indentation, the first indentation extends radially inward to a first indentation end defined by the first of the multiple of ligaments, and the second indentation extends radially outward to a second indentation end defined by the first of the multiple of ligaments;
   wherein the first of the multiple of ligaments consists of a first end segment, a second end segment and an intermediate segment disposed circumferentially between the first end segment and the second end segment;
   wherein the second end segment projects substantially radially in from the outer support ring, and partially defines the first indentation;

wherein the first end segment projects substantially radially out from the inner support ring, and partially defines the second indentation;
wherein the oil film damper comprises a first flange, a second flange and a center portion projecting radially outward from the first flange and the second flange;
wherein the center portion is disposed axially between the annular first spring and the annular second spring;
wherein the annular first spring is supported by the first flange; and
wherein the annular second spring is supported by the second flange.

7. The bearing compartment as recited in claim 6, wherein each of the multiple of ligaments are serpentine shaped and are circumferentially distributed.

8. The bearing compartment as recited in claim 6, wherein the inner support ring is supported upon the oil film damper.

9. The bearing compartment as recited in claim 6, wherein the outer support ring is supported upon the bearing support static structure.

10. The bearing compartment as recited in claim 6, further comprising an engine shaft, wherein the bearing assembly supports the engine shaft.

11. The bearing compartment as recited in claim 6, further comprising a retaining ring that retains the oil film damper to an outer race of the bearing assembly.

12. The bearing compartment as recited in claim 6, wherein each of the multiple of ligaments has an axial length that is less than an axial length of the bearing assembly.

13. The bearing compartment as recited in claim 6, wherein the first of the multiple of ligaments has a generally S-shaped sectional geometry.

14. A method, comprising:
locating an annular first spring radially between an oil film damper and a bearing support static structure, the first spring including a multiple of ligaments, an inner support and an outer support; and
locating an annular second spring radially between the oil film damper and the bearing support static structure, a center portion of the oil film damper axially separating the annular first spring from the annular second spring;
wherein a first of the multiple of ligaments is configured with a first recess and a second recess, the first recess has a first open end and a first closed end formed by a first surface of the first of the multiple of ligaments, the first recess extends radially inward from the first open end to the first closed end, the second recess has a second open end and a second closed end formed by a second surface of the first of the multiple of ligaments, and the second recess extends radially outward from the second open end to the second closed end;
wherein the first of the multiple of ligaments consists of a first end segment, a second end segment and an intermediate segment completely circumferentially between the first end segment and the second end segment;
wherein the second end segment projects substantially radially in from the outer support, and partially defines the first recess;
wherein the first end segment projects substantially radially out from the inner support, and partially defines the second recess;
wherein the oil film damper comprises a first flange, a second flange and the center portion which projects radially outward from the first flange and the second flange;
wherein the center portion is axially between the annular first spring and the annular second spring;
wherein the annular first spring is supported by the first flange; and
wherein the annular second spring is supported by the second flange.

15. The method as recited in claim 14, further comprising radially orienting the multiple of ligaments.

16. The method as recited in claim 14, wherein the multiple of ligaments are oriented in a serpentine.

17. The method as recited in claim 14, wherein the multiple of ligaments each have an axial length that is less than an axial length of the oil film damper.

18. The method as recited in claim 14, wherein the first spring and the second spring flank the oil film damper.

* * * * *

UNITED STATES PATENT AND TRADEMARK OFFICE
CERTIFICATE OF CORRECTION

| | | |
|---|---|---|
| PATENT NO. | : 9,850,814 B2 | Page 1 of 1 |
| APPLICATION NO. | : 14/626659 | |
| DATED | : December 26, 2017 | |
| INVENTOR(S) | : Gary L. Grogg | |

It is certified that error appears in the above-identified patent and that said Letters Patent is hereby corrected as shown below:

In the Specification

Column 6, Line 15, please delete "foil" and insert --form--.

In the Claims

Column 8, Line 32, please insert --The-- before "assembly".

Signed and Sealed this
Eighth Day of May, 2018

Andrei Iancu
*Director of the United States Patent and Trademark Office*